United States Patent
Ling et al.

(10) Patent No.: US 10,892,971 B2
(45) Date of Patent: Jan. 12, 2021

(54) SYSTEM AND METHOD FOR NETWORK COMMUNICATION MONITORING

(71) Applicant: Arch Systems Inc., Mountain View, CA (US)

(72) Inventors: Christopher Ling, Mountain View, CA (US); Luke Michael Ekkizogloy, Mountain View, CA (US); Timothy Matthew Burke, Mountain View, CA (US)

(73) Assignee: Arch Systems Inc., Mountain View, CA (US)

(*) Notice: Subject to any disclaimer, the term of this patent is extended or adjusted under 35 U.S.C. 154(b) by 0 days.

(21) Appl. No.: 16/814,308

(22) Filed: Mar. 10, 2020

(65) Prior Publication Data

US 2020/0296024 A1 Sep. 17, 2020

Related U.S. Application Data

(60) Provisional application No. 62/817,384, filed on Mar. 12, 2019.

(51) Int. Cl.
| | |
|---|---|
| *H04L 12/26* | (2006.01) |
| *H04L 12/40* | (2006.01) |
| *H04L 29/06* | (2006.01) |
| *H04B 1/16* | (2006.01) |

(52) U.S. Cl.
CPC .......... *H04L 43/106* (2013.01); *H04B 1/16* (2013.01); *H04L 12/40* (2013.01); *H04L 69/22* (2013.01)

(58) Field of Classification Search
None
See application file for complete search history.

(56) References Cited

U.S. PATENT DOCUMENTS

| | | |
|---|---|---|
| 5,313,614 A | 5/1994 | Goettelmann et al. |
| 6,132,109 A | 10/2000 | Gregory et al. |
| 6,615,166 B1 | 9/2003 | Guheen et al. |
| 7,013,456 B1 | 3/2006 | Van et al. |
| 7,092,867 B2 | 8/2006 | Huang et al. |
| 7,296,267 B2 | 11/2007 | Cota-Robles et al. |
| 7,761,859 B2 | 7/2010 | Low |
| 7,827,531 B2 | 11/2010 | Sen et al. |
| 7,958,488 B2 | 6/2011 | Cifra |
| 8,190,807 B2 | 5/2012 | Reid et al. |
| 8,229,726 B1 | 7/2012 | Magdon-Ismail et al. |
| 8,291,387 B2 | 10/2012 | Pal et al. |
| 8,326,449 B2 | 12/2012 | Hartz et al. |
| 8,468,535 B1 | 6/2013 | Keagy et al. |
| 8,640,110 B2 | 1/2014 | Kopp et al. |
| 8,650,552 B1 | 2/2014 | Liao |
| 8,671,293 B2 | 3/2014 | Qi et al. |

(Continued)

FOREIGN PATENT DOCUMENTS

WO  WO-2014013303 A1 * 1/2014 ......... H04L 41/5038

OTHER PUBLICATIONS

"AM3358: PRU Ethernet issue", Texas Instrument, Sep. 10, 2018, https://e2e.ti.com/support/processors/f/791/p/724384/2675485#2675485.

(Continued)

*Primary Examiner* — Bob A Phunkulh
(74) *Attorney, Agent, or Firm* — Jeffrey Schox; Samuel Rosenthal

(57) ABSTRACT

A system for network communication monitoring, preferably including one or more network receivers, packet decoders, stream mergers, and/or memory. A method for network communication, preferably including receiving bitstreams, decoding packets, and/or merging packet streams.

18 Claims, 7 Drawing Sheets

(56) References Cited

U.S. PATENT DOCUMENTS

| | | | |
|---|---|---|---|
| 8,769,485 | B2 | 7/2014 | Salz et al. |
| 8,902,922 | B2 | 12/2014 | Soni et al. |
| 9,021,452 | B2 | 4/2015 | Kripalani |
| 9,244,742 | B2 | 1/2016 | Gulati et al. |
| 9,348,632 | B2 | 5/2016 | Ge et al. |
| 9,459,984 | B2 | 10/2016 | Bratanov |
| 9,471,347 | B2 | 10/2016 | Birke et al. |
| 9,727,440 | B2 | 8/2017 | Suit |
| 10,303,820 | B2 | 5/2019 | Yim et al. |
| 2003/0188299 | A1 | 10/2003 | Broughton et al. |
| 2006/0248106 | A1* | 11/2006 | Milne ............... H04L 43/0847 |
| 2010/0286797 | A1 | 11/2010 | Liu et al. |
| 2012/0096146 | A1* | 4/2012 | Barnett ............. G06F 16/1748 709/224 |
| 2012/0116774 | A1 | 5/2012 | Forsell |
| 2012/0243866 | A1* | 9/2012 | Noble .................. H04L 41/00 398/25 |
| 2016/0357443 | A1 | 12/2016 | Li et al. |
| 2016/0364927 | A1 | 12/2016 | Barry et al. |

OTHER PUBLICATIONS

"Ethernet Analysis Made Easy—netANALYZER", Hilscher ANL-B500G-RE datasheet, retrieved on Mar. 3, 2020 from: https://www.hilscher.com/fileadmin/cms_upload/en-US/Resources/pdf/netANALYZER_Datasheet_10-2018_GB.pdf.

"Real-Time Ethernet Tracer for PRU-ICSS Reference Design", Texas Instruments, TIDUCD4-Oct. 2016, https://e2e.ti.com/support/processors/f/791/p/724384/2675485#2675485.

Christyakov, Alexander, et al., "On Development of a Framework for Massive Source Code Analysis Using Static Code Analyzers", ACM, pp. 1-3, 2017.

Deanna, Bob, et al., "Simulation Monitoring Using Mobile Agent Technology", ACM pp. 47-52 (Year: 2007).

Dwyer, Matthew B., et al., "A Flexible Architecture for Building Data Flow Analyzers", IEEE, pp. 554-564, 1996.

Kwon, Taeho, et al., "Detecting and Analyzing Insecure Component Usage", ACM, pp. 1-11, 2012.

Mulford, James O., "The Application of Software Monitor Data to Simulation", ACM, 162-170, Jun. 19-20, 1973.

Su, Ching-Hsiang, et al., "Exploiting a Cloud Framework for Automatically and Effectively Providing Data Analyzers", 2017 IEEE 7th International Symposium on Cloud and Service Computing, pp. 231-236, 2017.

Lopez-Higuera, et al, "Simple Low-Frequency Optical Fiber Accelerometer with Large Rotating Machine Monitoring Applications", IEEE, 1120-1130 (Year: 1997).

Purandare et al, "Optimizing Monitoring of Finite State Properties through Monitor Compaction", ACM, pp. 28-290 (Year: 2013).

* cited by examiner

SYSTEM AND METHOD FOR NETWORK COMMUNICATION MONITORING

CROSS-REFERENCE TO RELATED APPLICATIONS

This application claims the benefit of U.S. Provisional Application Ser. No. 62/817,384, filed on 12 Mar. 2019, which is incorporated in its entirety by this reference.

TECHNICAL FIELD

This invention relates generally to the network communication field, and more specifically to a new and useful system and method for network communication monitoring.

BACKGROUND

Typical systems for network communication monitoring exhibit one or more important limitations. A first class of such systems actively tap signal transmission elements, which can produce undesirable effects for the signals transmitted on those signal transmission elements, such as interruptions (e.g., when the active tap is unpowered, deactivated, and/or in a failure state) and/or delays. A second class of such systems passively tap signal transmission elements, but are incapable of aggregating signals from multiple such elements into a single stream. A third class of such systems (e.g., Hilscher ANL-B500G-RE) can aggregate signals from multiple signal transmission elements, but require that these signals exhibit one or more "Layer 2" characteristics of IEEE 802.3 Ethernet standards.

Thus, there is a need in the network communication field to create a new and useful system and method for network communication monitoring.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1A:
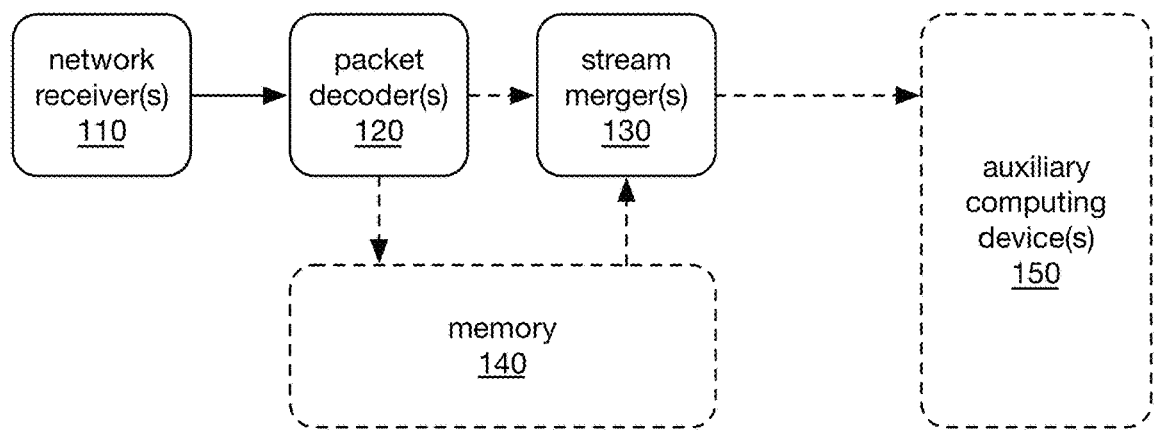
FIG. 1A is a schematic representation of an embodiment of the system.
Figure 1B:
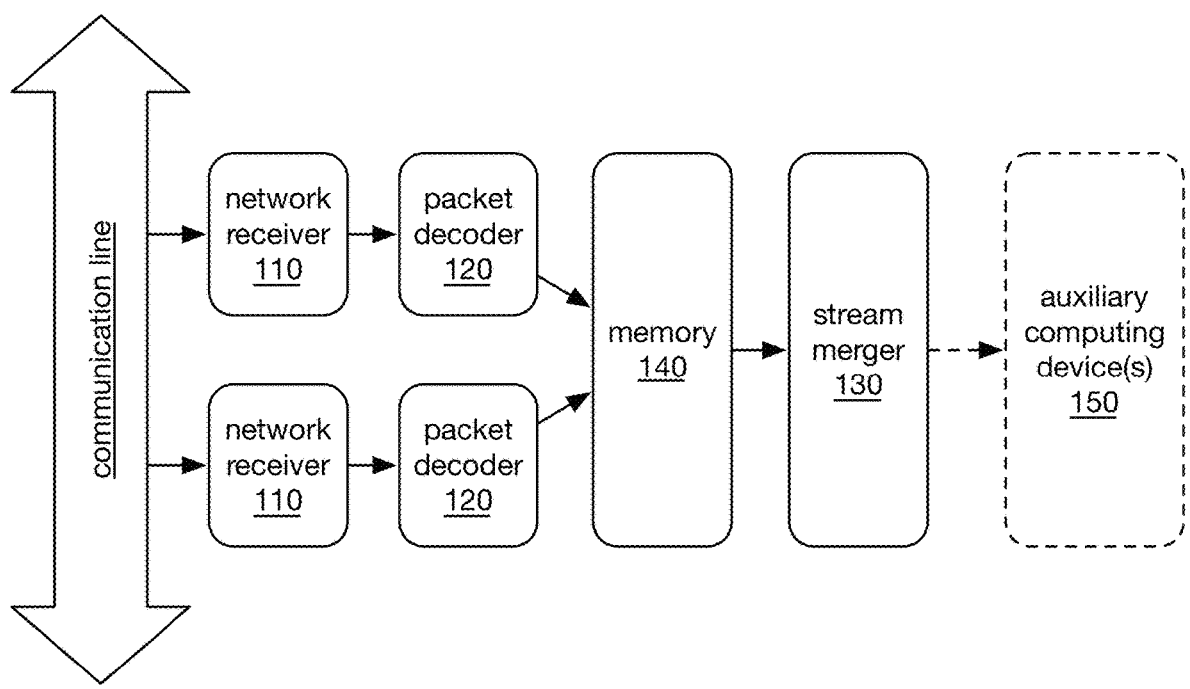
FIGS. 1B-1D are schematic representations of examples of the embodiment of the system.
Figure 2:
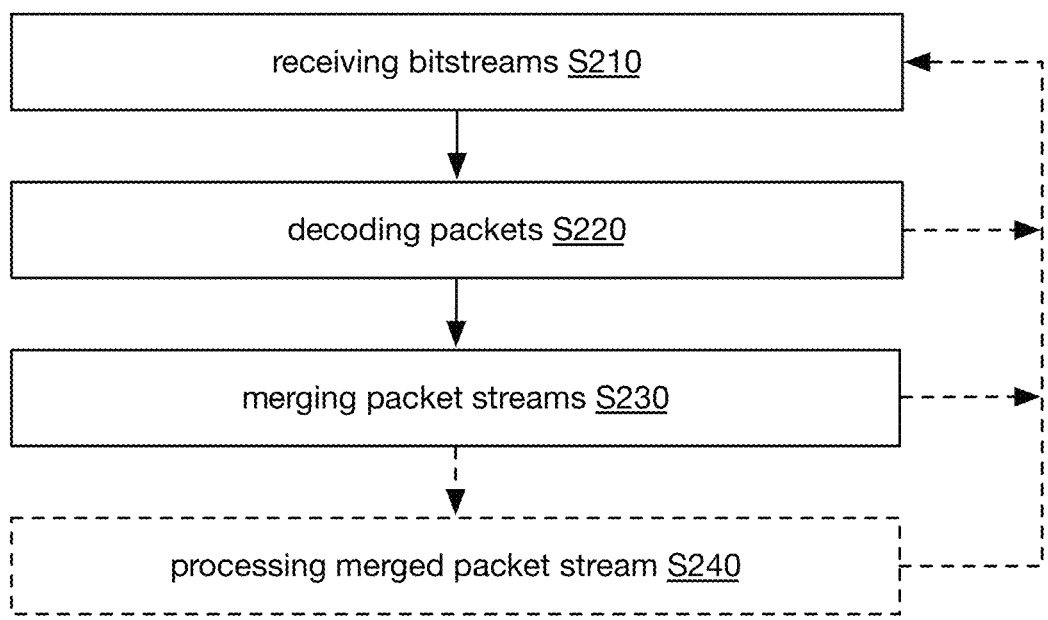
FIG. 2 is a schematic representation of an embodiment of the method.

A system 100 for network communication monitoring preferably includes one or more: network receivers 110, packet decoders 120, stream mergers 130, and/or memory 140 (e.g., as shown in FIGS. 1A-1B). The system 100 can optionally include one or more auxiliary computer devices 150. A method 200 for network communication preferably includes: receiving bitstreams S210, decoding packets S220, and/or merging packet streams S230 (e.g., as shown in FIG. 2). The method 200 can optionally include processing the merged packet stream S240. However, the system 100 and/or method 200 can additionally or alternatively include any other suitable elements.

2. Benefits

The system and/or method for network communication monitoring can confer one or more benefits.

First, embodiments of the system and/or method can monitor signals propagating along one or more signal transmission elements without deleterious interference with those signals. For example, the signals can preferably be monitored without substantially delaying (e.g., not delaying by more than a threshold amount, such as 1, 2, 5, 10, 20, 50, 100, 200, 500, 1000, 0.1-1, 1-10, 10-100, 100-1000, or 1000-10,000 ns, etc.) propagation of the signals along the signal transmission element(s). Additionally or alternatively, use of the system and/or method preferably does not result in interruption of signal propagation (e.g., causing the signals not to propagate along the signal transmission element(s)), even in situations in which the system is in an atypical or failure state (e.g., unpowered, deactivated, functioning erroneously, etc.).

Second, embodiments of the system and/or method can aggregate monitored signals from multiple signal transmission elements, preferably while substantially maintaining a chronological ordering of such signals. For example, if the system and/or method is used to monitor both directions of a bidirectional communication line (e.g., CAT5 or CAT6 cable), the system and/or method can aggregate signals propagating in both directions along the communication line and preserve their chronological order (e.g., such that a query, sent in one direction along the communication line, appears before a response to the query, sent in the other direction along the communication line after receipt of the query).

Third, embodiments of the system and/or method can monitor signals that do not exhibit some or all "Layer 2" characteristics of a signal transmission standard, such as IEEE 802.3 Ethernet standards. For example, the system and/or method can monitor signals that conform to the portions of one or more such standards associated with "Layer 1" behavior, but not to some or all portions associated with "Layer 2" behavior. In specific examples, such signals can exhibit one or more of: packet sizes less than 64 bytes, inter-frame gaps of less than 960 ns and/or less than 96 bit times, preambles of less than 7 bytes, absence of elements such as preambles, start frame delimiters, and/or frame check sequences, and/or presence of elements not found in standard Ethernet packets. However, the signals can additionally or alternatively exhibit any other suitable characteristics.

The system and/or method can additionally or alternatively confer any other suitable benefits.

3. System

3.1 Network Receiver

The network receiver 110 preferably functions to receive a communication bitstream (e.g., from a communication medium, such as one or more communication lines of a field bus and/or any other suitable communication lines). The communication bitstream is preferably received from a signal transmission element, which is preferably an element associated with a single signal stream. For example, in a communication line (e.g., CAT5 or CAT6 cable) that includes multiple pairs of wires, wherein each pair of wires is associated with a single stream of communication signals, each such pair of wires can be considered a separate signal transmission element.

The network receiver is preferably a passive tap. The network receiver preferably imposes no delay (or substantially no delay, such as a delay of less than 0.1, 0.2, 0.5, 1, 2, 5, 10, 0.01-0.1, 0.1-0.5, 0.3-1, 0.5-2, 1-3, or 3-30 µs) on the bitstream propagating along the line (e.g., the field bus). The network receiver preferably does not interrupt (e.g., prevent propagation of) transmissions along the medium (e.g., line), even if the system 100 and/or a portion thereof (e.g., the network receiver) fails (e.g., loses power, functions erroneously, etc.). The network receiver preferably does not generate any output on the line (e.g., is not configured to generate any output, is not capable of generating any output, etc.). Alternatively, the network receiver can include an active tap (e.g., implementing a store-and-forward tapping process) and/or any other suitable taps.

Figure 3:
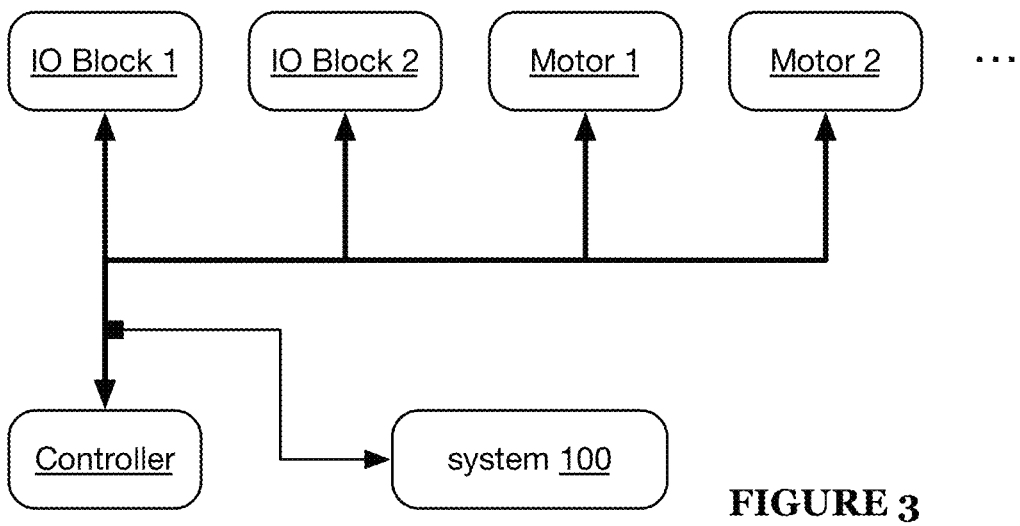
FIG. 3 is a schematic representation of an example environment of the system.

The system preferably includes two network receivers 110, wherein each receiver taps the transmission line(s) associated with one direction of network traffic. Thus, the two receivers can be used together to capture bidirectional traffic between two network devices (e.g., between two endpoints; between a controller and a device hub or network switch, such as a hub or switch connected to some or all other devices of a machine; etc.; such as shown in FIG. 3). Alternatively, the system can include more than two receivers (e.g., capturing traffic between more than two network devices), can include a single receiver (e.g., capturing only unidirectional traffic, solely responsible for capturing bidirectional traffic, etc), and/or can include any other suitable number of receivers.

Figure 4:
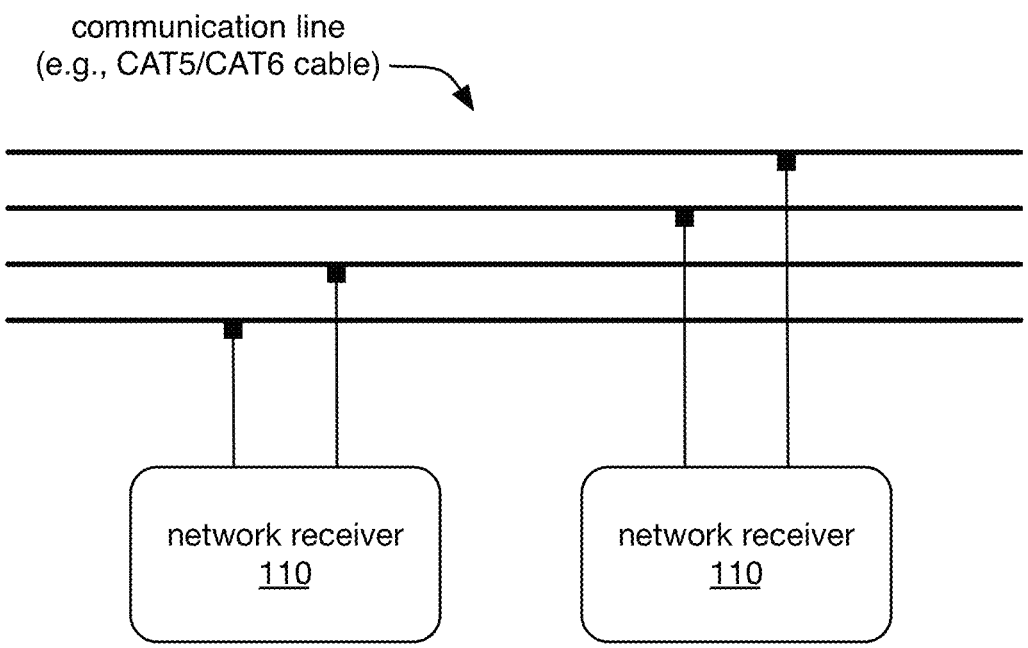
FIG. 4 is a schematic representation of an example of network receivers of the system.

The network receiver preferably includes physical layer receiver circuitry (e.g., associated with one or more physical layer transmission standards, such as Ethernet 100BASE-T, any other Ethernet standard, and/or any other suitable standard, etc.). The network receiver preferably includes one or more wires or other conductors (e.g., defining one or more electrical T-junctions, such as shown in FIG. 4) coupling the receiver circuitry to the transmission lines (e.g., to each wire and/or other conductor of the transmission lines, to the subset of conductors associated with transmission in a particular direction, etc.). Such an electrical configuration can enable the receiver circuitry to sample the voltage of each conductor of the transmission lines (e.g., in a 100BASE-TX Ethernet line, the two conductors of the transmit pair and the two conductors of the receive pair). However, the network receiver 110 can additionally or alternatively include any other suitable elements in any suitable arrangement.

3.2 Packet Decoder

The packet decoder 120 preferably functions to convert a bitstream (e.g., received by the network receiver) into packets (e.g., timestamped packets). The system preferably includes one packet decoder 120 for each network receiver no (e.g., one packet decoder coupled to and/or receiving a bitstream from each network receiver). The packet decoder preferably includes one or more real-time computing elements. For example, the packet decoder can include one or more CPUs (or CPU cores), preferably real-time CPUs or CPU cores, ASICs, FPGAs, and/or any other suitable computing circuitry. The packet decoder 120 preferably shares a clock signal with one or more other packet decoders (e.g., with the other packet decoder(s) of the system, etc.). This shared clock signal can enable use of a shared timestamp reference (e.g., for packets in the different bitstreams), thereby facilitating downstream merging of the different packet streams (e.g., by the stream merger 130. However, the packet decoder 120 can additionally or alternatively include any other suitable elements in any suitable arrangement.

The packet decoder is preferably configured to and/or capable of processing each packet within a packet time interval (e.g., actual or minimum packet duration time, time between the start or end of consecutive packets, etc.), such as processing the packet before arrival of the next packet and/or processing packets while satisfying a zero-backpressure condition (e.g., wherein the rate of incoming packets from the bitstream cannot be reduced, wherein the packet decoder does not drop any packets, etc.). For example, for a bitstream with a rate of 10 ns/bit (e.g., transmitted on a 100BASE-T Ethernet communication line) and a minimum packet size of six bytes (e.g., associated with a VARAN bitstream), each packet is preferably capable of being processed by the packet decoder within the 480 ns interval associated with the minimum packet size. For a 200 MHz decoder CPU, this corresponds to processing each packet within 96 clock cycles (e.g., using no more than 96 instructions).

The packet decoder preferably writes the processed packets (e.g., timestamped packets) to the memory 140. However, the packet decoder can additionally or alternatively store and/or provide the processed packets in any other suitable manner.

3.3 Stream Merger

The stream merger 130 preferably functions to generate a merged packet stream. The stream merger preferably merges packets from multiple streams (e.g., from both receivers and/or decoders) into a single stream (e.g., chronologically ordered stream). The stream merger preferably includes one or more general purpose computing elements (e.g., CPUs and/or CPU cores), but can additionally or alternatively include real-time CPUs and/or CPU cores, ASICs, FPGAs, and/or any other suitable computing elements.

The stream merger is preferably configured to read packets from memory (e.g., from the memory 140 to which the packet decoders write), but can additionally or alternatively receive packet streams from any other suitable sources. The stream merger 130 preferably provides the merged packet stream to one or more downstream consumers (e.g., the auxiliary computing device(s) 150, but can additionally or alternatively provide the packet streams in any other suitable manner. For example, the stream merger can be communicatively coupled to an auxiliary computing device, such as by a network communication system (e.g., wired communication lines, wireless communication units, etc.). However, the stream merger 130 can additionally or alternatively include any other suitable elements in any suitable arrangement.

3.4 Memory

The memory 140 is preferably RAM, more preferably fast random access memory (e.g., processor cache memory, SRAM, etc.) but alternatively any other suitable RAM (or any other suitable computing memory). The memory 140 is preferably shared between the stream merger 130 and all packet decoders 120 of the system. However, the memory can additionally or alternatively be shared between any other suitable elements, can be dedicated to individual elements (e.g., partitioned between the individual packet decoders and/or stream merger, such as wherein one element does not read from and/or write to a partition associated with a different element), and/or can be distributed in any other suitable manner.

3.5 Auxiliary Computing Device

The auxiliary computing device 150 can function to perform computations, such as data analysis, filtering, modification, and/or storage. These operations are preferably performed based on the merged packet stream (e.g., the packet stream received from the stream merger 130). For example, the auxiliary computing device can perform one or more operations such as described in U.S. patent application Ser. No. 16/218,164, titled "System and Method for Physical Machine Monitoring and Analysis" and filed 12 Dec. 2018, which is hereby incorporated in its entirety by this reference (e.g., as described below, such as regarding S240).

The auxiliary computing device can include one or more processors (e.g., CPU, GPU, microprocessor, FPGA, ASIC, etc.), computers, and/or data storage elements (e.g., Flash, RAM, magnetic disk drive, etc.), but can additionally or alternatively include any other suitable elements. The auxiliary computing device preferably receives the merged packet stream (e.g., from the stream merger 130), such as via shared memory, communication link (e.g., TCP link), and/or in any other suitable manner. However, the auxiliary computing device 150 can additionally or alternatively include any other suitable elements in any other suitable arrangement.

3.6 Examples

Figure 1C:
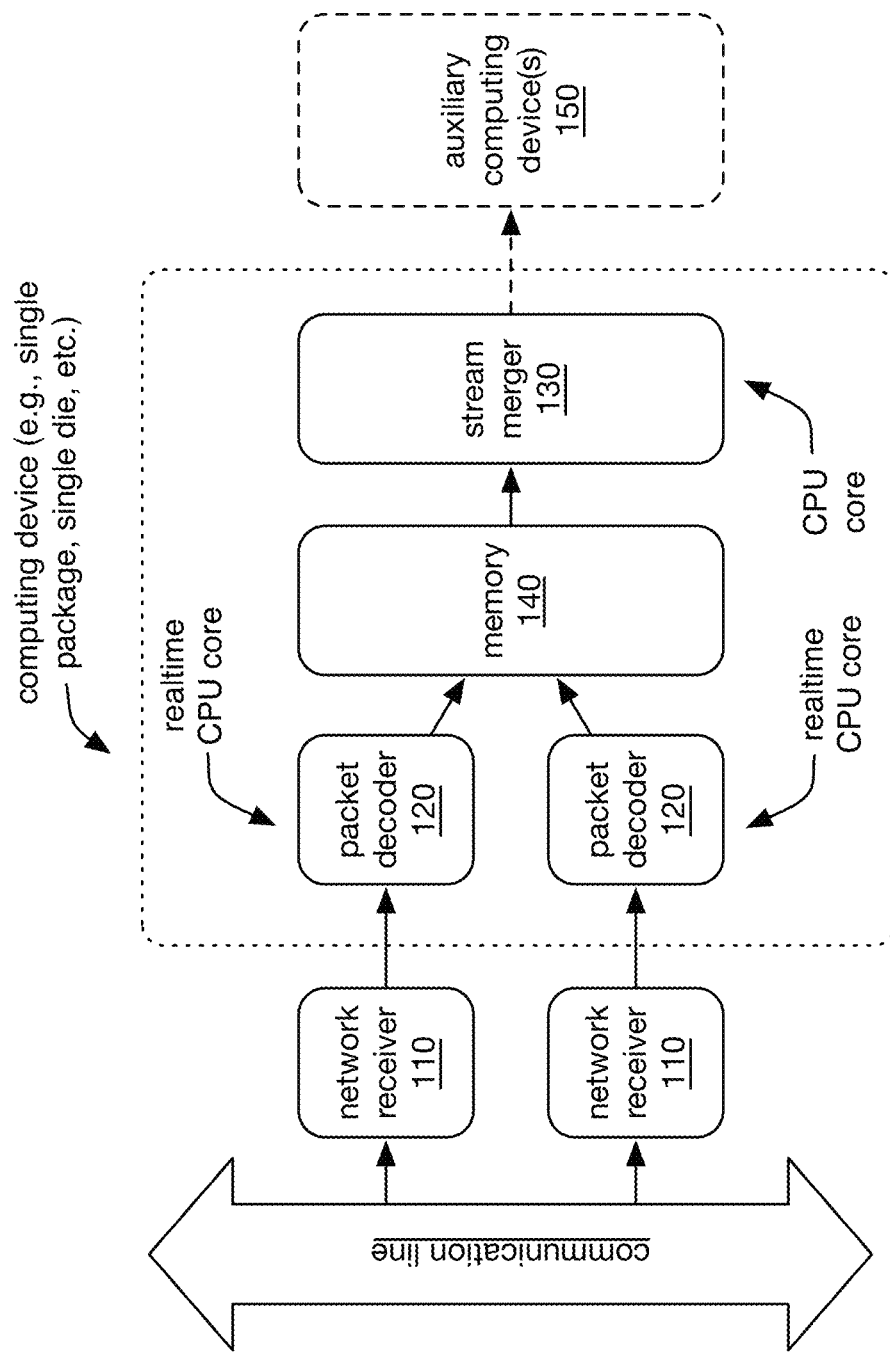
Figure 1D:
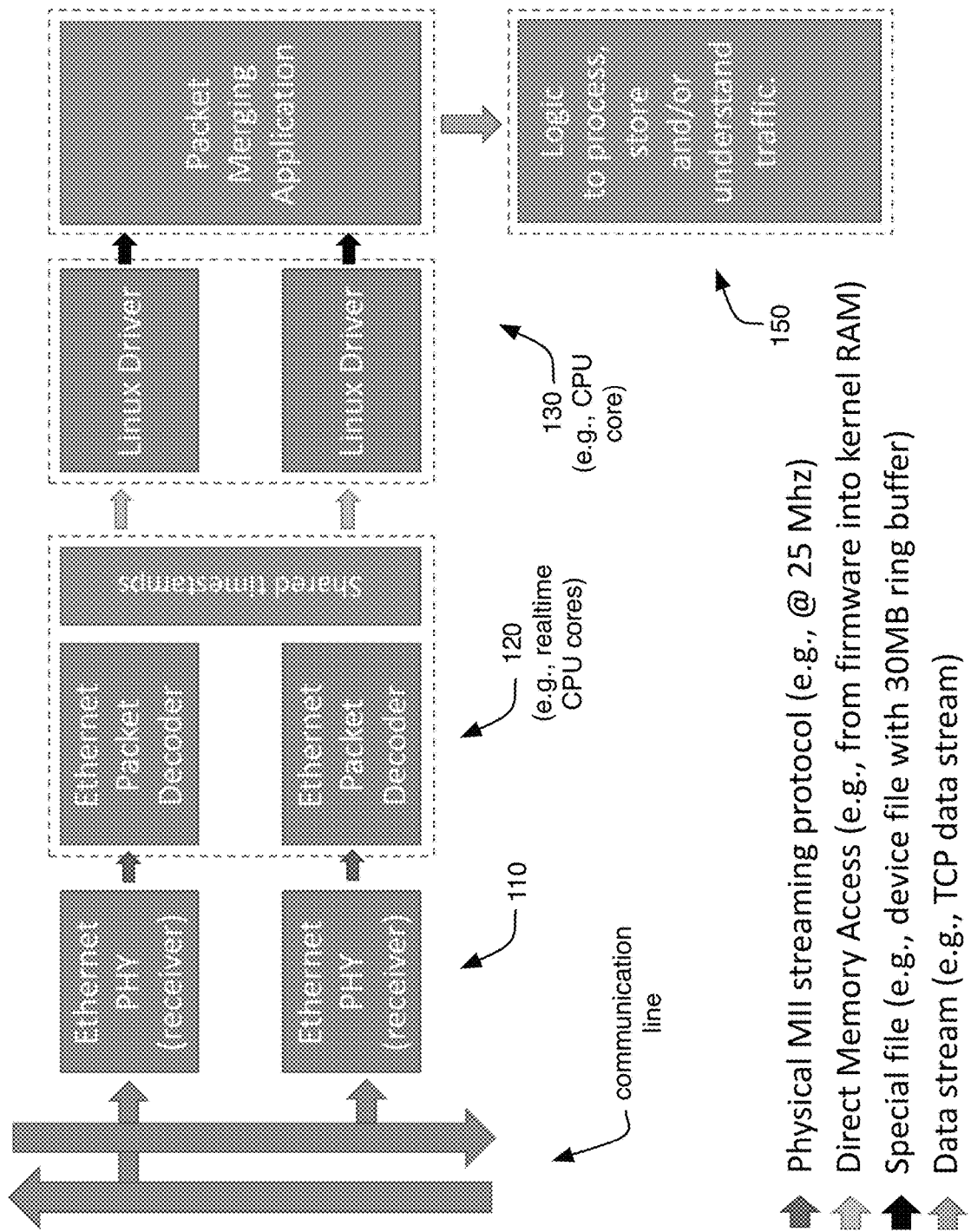
Figure 5B:
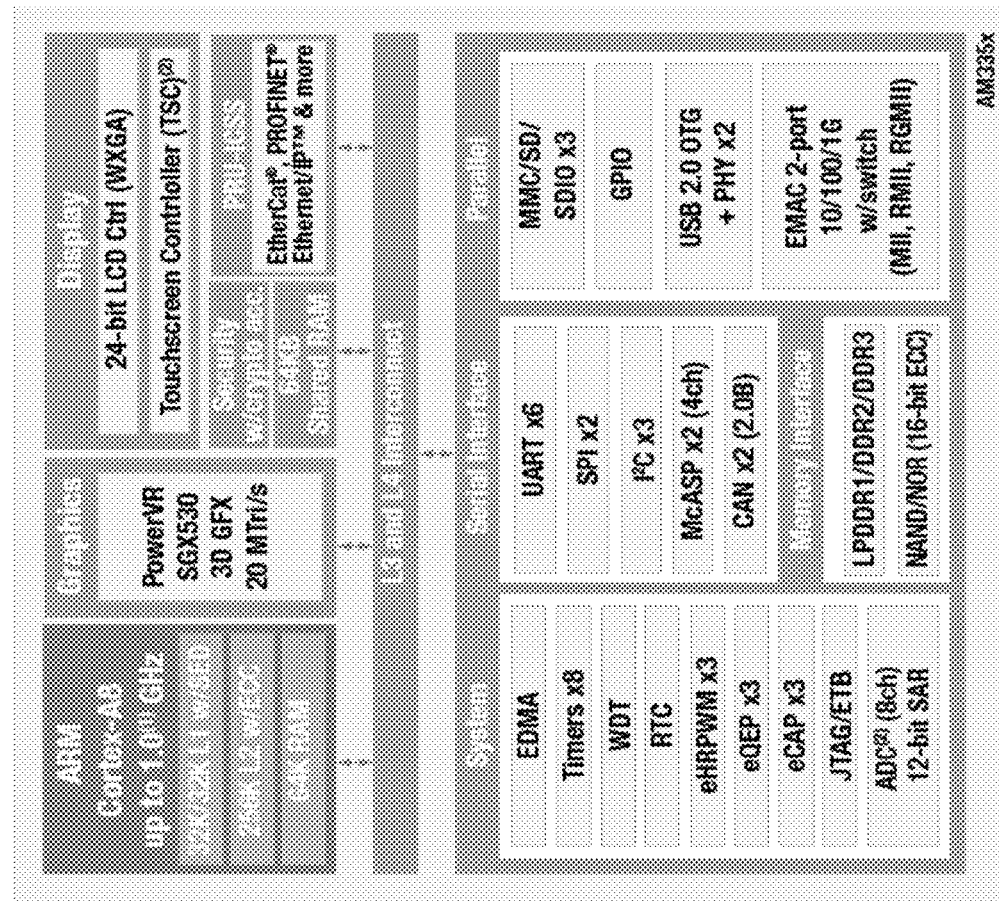
FIGS. 5A-5B are schematic representations of an embodiment and an example, respectively, of a multi-core processor.
Figure 5A:
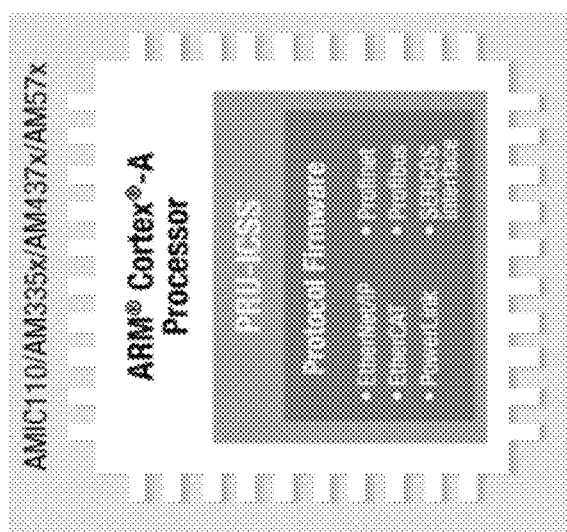
Figure 5C:
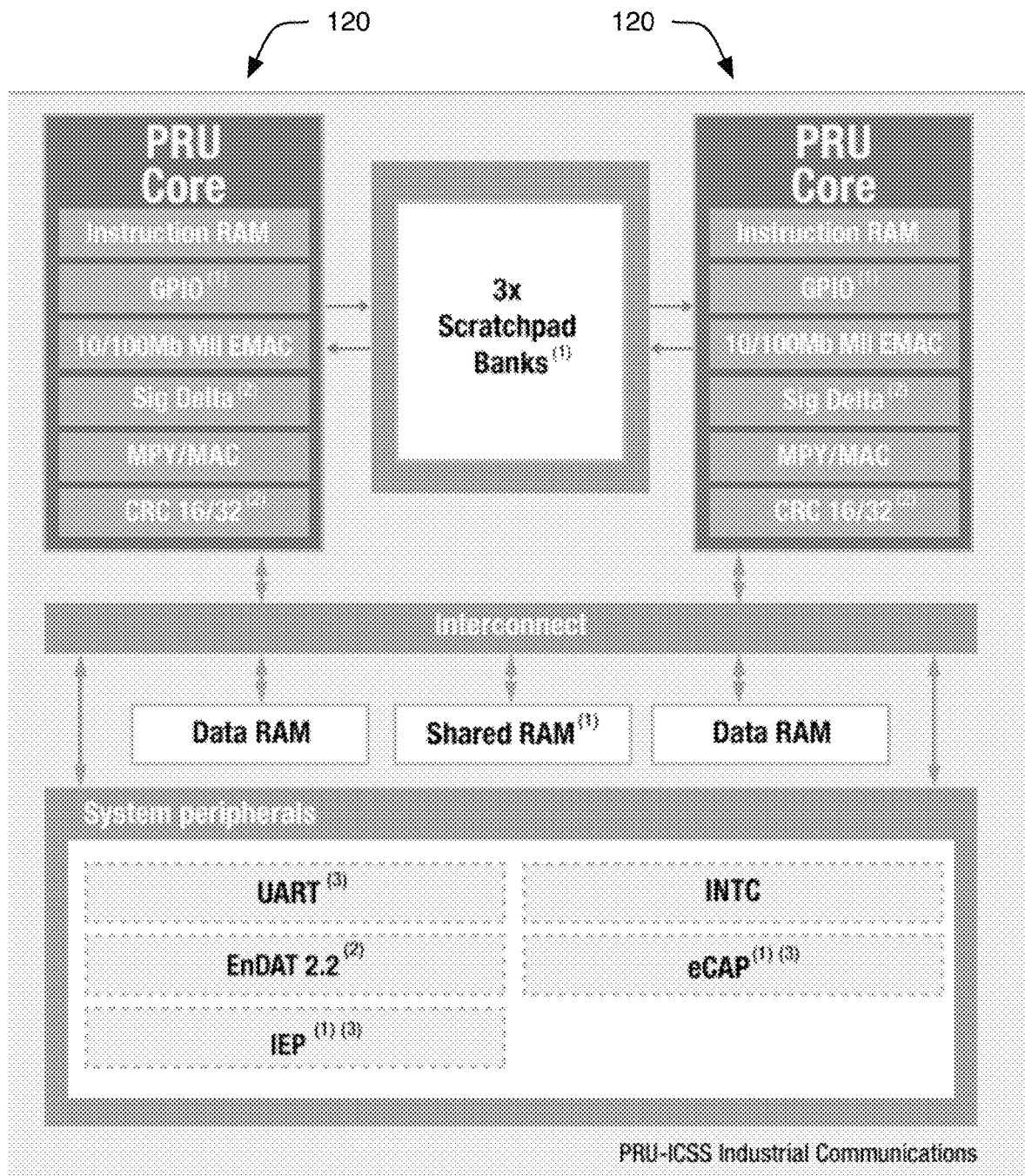
FIG. 5C is a schematic representation of an example of packet decoders of the multi-core processor.

In a first example (e.g., as shown in FIGS. 1C-1D), the system 100 includes two network receivers (e.g., each network receiver including physical layer receiver circuitry, such as for Ethernet communications); two real time CPUs or CPU cores in a one-to-one pairing with the receivers (e.g., wherein each accepts a bitstream from a different receiver) and sharing a single clock; a general purpose CPU or CPU core; and memory (e.g., RAM) shared between the real-time CPUs and general purpose CPU. In a specific example (e.g., as shown in FIGS. 5A-5C), the system includes two real-time CPU cores, a general purpose CPU core (e.g., an ARM core), and shared memory (e.g., processor cache) all in the same package and/or on the same die (e.g., as a single integrated circuit); for example, these elements can be included in a multi-core processor such as in the Texas Instruments Sitara™0 product line (e.g., Sitara™ AM335X product line, such as the AM3356, AM3357, AM3358, and/or AM3359.

In an alternative example, a single element (e.g., a real-time CPU) can function as both packet decoders 120 (or optionally, in embodiments including more than two packet decoders, as all the packet decoders or any suitable subset thereof). In this example, this element can optionally also function as the stream merger 130. This element preferably receives bitstreams from each network receiver and converts both bitstreams into timestamped packets, and can optionally merge these timestamped packets into a single packet stream.

However, the system 100 can additionally or alternatively include any other suitable elements in any suitable configuration.

4. Method

The method 200 is preferably implemented using the system 100 described above, but can additionally or alternatively be implemented using any other suitable system(s).

4.1 Receiving Bitstreams

Receiving bitstreams S210 is preferably performed by one or more network receivers (e.g., each network receiver of the system). Each bitstream (e.g., Fieldbus bitstream) is preferably an MII bitstream (e.g., traffic conforming to Ethernet Layer 1 standards, MII traffic such as described in the Appendix, etc.), but can additionally or alternatively include any other suitable bitstreams. For example, the bitstreams can be bitstreams of a communication system such as: Ethernet (e.g., Fast Ethernet), EtherCAT, VARAN, GPIB, Bitbus, RS-232, Centronics, IEEE 1284, RJ11, USB, and/or any other suitable network communication system.

The bitstreams may or may not conform to one or more Ethernet specifications (e.g., one or more of the IEEE 802.3 standards, which are hereby incorporated in their entireties by this reference; as described in the Appendix; etc.), such as to the portions of the specifications associated with Layer 1 (physical layer) behavior, Layer 2 (data link layer) behavior, etc. In some embodiments, the bitstreams may exhibit atypical characteristics (e.g., Layer 2 characteristics) compared to a standard Ethernet bitstream. For example, the bitstreams may include a minimum packet size less than 64 bytes (e.g., 1, 2, 4, 6, 8, 16, 32, 1-4, 4-8, 8-16, or 16-64 bytes), a minimum inter-frame gap less than 960 ns and/or less than 96 bit times (e.g., 0, 80, 160, 320, 640, 0-80, 80-320, or 320-960 ns; 0, 8, 16, 32, 64, 0-8, 8-32, or 32-96 bit times; etc.), and/or a minimum preamble of less than 7 bytes (e.g., 0, 1, 2, 4, 6, 0-1, 1-3, or 3-7 bytes); may include no start frame delimiter (SFD) and/or frame check sequence (FCS); may include elements (e.g., start- and/or end-of-frame elements) not found in standard Ethernet packets; and/or may exhibit any other suitable characteristics.

The bitstreams preferably exhibit bit times greater than 5 ns (e.g., substantially 10 ns, such as for 100 Mb/s Ethernet or "Fast Ethernet"; substantially 100 ns such as for 10 Mb/s Ethernet; etc.), but can additionally or alternatively exhibit bit times less than or equal to 5 ns (e.g., substantially 1 ns, such as for 1 Gb/s Ethernet or "Gigabit Ethernet"; substantially less than 1 ns; etc.) and/or any other suitable bit times.

The bitstreams are preferably received continuously (e.g., whenever transmissions are sent along the communication line), but can additionally or alternatively be received periodically, sporadically, in response to trigger events, and/or with any other suitable timing. However, S210 can additionally or alternatively include receiving bitstreams in any other suitable manner.

4.2 Decoding Packets

Decoding packets S220 is preferably performed at the packet decoder or decoders (e.g., for a given bitstream, performed at the packet decoder associated with the network receiver at which the bitstream is received). S220 is preferably performed continuously (e.g., whenever S210 is performed), but can additionally or alternatively be performed periodically, sporadically, in response to trigger events, and/or with any other suitable timing.

S220 preferably includes: parsing the bitstream into packets; associating each packet with a time stamp (e.g., based on a shared clock signal); and/or storing the packets (e.g., in shared memory). S220 can optionally include correcting parse errors (e.g., before storing the packets). For example, S220 can include detecting and/or correcting parse errors created due to inappropriate assumptions (e.g., encoded in hardware, firmware, and/or software subsystems of the packet decoder 120), such as assumptions associated with Layer 2 characteristics of the bitstream (e.g., assumptions that the bitstream will conform to one or more characteristics associated with behavior under one or more of the 802.3 standards, such as characteristics described in the Appendix).

In one example, when a bitstream includes a 0x5 nibble followed by a 0xD nibble (e.g., X5 DY, for arbitrary nibbles X and Y) this nibble sequence may be misinterpreted (e.g., by the hardware) as an SFD byte (e.g., misaligned SFD byte), which is typically the 0x5D byte. This misinterpretation can result in a corrupted bitstream. For example, the packet decoder may drop the 0xD nibble, causing all following byte boundaries to be misaligned. The hardware may additionally or alternatively drop the final nibble (e.g., when the packet ends with a checksum, the final nibble of the checksum, such as the second nibble of the second byte of a CRC-16 checksum), such as due to this byte boundary misalignment. In this example, correcting parse errors can include performing a packet checksum test (e.g., in examples in which the second checksum byte is dropped, performing the test based only on the first checksum byte). If the packet checksum test fails, correcting parse errors can include attempting to insert a 0xD nibble at various locations in the parsed packet to generate a candidate packet, and performing the checksum test on the candidate packet(s) (e.g., inserting the nibble at each of a variety of different locations, preferably until a candidate packet is determined for which the checksum test is passed). For example, the 0xD nibble can be inserted after any 0x5 nibbles, after 0x5 nibbles that appear as the second nibble of a byte (e.g., appearing in such positions in the corrupted packet), and/or in any other suitable locations.

However, S220 can additionally or alternatively include decoding packets in any other suitable manner.

4.3 Merging Packet Streams

Merging the packet streams S230 is preferably performed at the stream merger. S230 preferably includes merging timestamped packets (e.g., packets from multiple streams, such as the streams generated in S220) into a single stream (e.g., chronologically-ordered packet stream). S230 can include writing the generated stream to memory and/or other storage, transmitting the stream to one or more auxiliary computing devices, and/or providing the stream in any other suitable manner.

In one example (e.g., in which the stream merger includes a CPU running a general purpose operating system, such as an ARM CPU core running Linux), S230 can include: at one or more drivers (e.g., one driver associated with each packet decoder), presenting the timestamped packets (e.g., written by the packet decoder) to a merging application. For example, each driver can place the timestamped packets into a buffer (e.g., dedicated buffer for each driver), which can facilitate rate matching (e.g., between the packet streams). The buffer is preferably a ring buffer, but can additionally or alternatively include one or more buffers of any other suitable types. The buffer is preferably megabyte-scale (e.g., 1, 2, 5, 10, 20, 30, 40, 60, 100, 200, 500, 1-3, 3-10, 10-30, 20-50, 30-100, or 100-1000 MB), but can alternatively have any other suitable capacity (e.g., 1-10, 10-100, or 100-1000 kB; 1-3, 3-10, or 10-30 GB; less than 1 kB, more than 30 GB; etc.). The buffer can be presented as a device file (or special file), and/or can be accessible (e.g., to the merging application) in any other suitable manner. The drivers preferably use direct memory access (DMA) to access the timestamped packets (e.g., the packets written to shared memory in S220), but can additionally or alternatively receive the packets in any other suitable manner. In this example, the merging application preferably receives timestamped packets from each driver and merges them into a single packet stream (e.g., accepting the timestamped packets and merging them into a chronologically-ordered packet stream).

S230 is preferably performed continuously (e.g., whenever S220 is performed). However, some or all of S230 can additionally or alternatively be performed periodically, sporadically, in response to trigger events, and/or with any other suitable timing. In one example, the drivers preferably place packets into the buffer(s) continuously, substantially continuously, periodically, and/or in response to trigger events such as whenever packets are available (e.g., packets that have not yet been placed into the buffer) and/or exceed a storage threshold, but alternatively with any other suitable timing; and the merging application can run continuously, substantially continuously, periodically, sporadically, in response to trigger events (e.g., one or more buffers exceeding a storage threshold, such as a percentage of total buffer storage volume), and/or with any other suitable timing.

However, S230 can additionally or alternatively include merging the packet streams in any other suitable manner.

4.4 Processing the Merged Stream

Processing the merged stream S240 is preferably performed by one or more auxiliary computing devices, but can additionally or alternatively be performed by any other suitable elements. S240 can be performed continuously, substantially continuously, periodically, sporadically, in response to trigger events (e.g., receipt of data, such as receipt of packets in the merged packet stream), and/or with any other suitable timing.

S240 (and/or any other suitable elements of the method 200) can include one or more elements such as described in U.S. patent application Ser. No. 16/218,164, titled "System and Method for Physical Machine Monitoring and Analysis" and filed 12 Dec. 2018, which is hereby incorporated in its entirety by this reference (e.g., wherein receiving transmissions supplied to a physical machine S100 of U.S. patent application Ser. No. 16/218,164 can include receiving the bitstreams, such as described above regarding S210, receiving the merged stream, such as at the auxiliary computing device(s), and/or receiving any other suitable information associated with the transmissions). However, S240 can additionally or alternatively include processing the merged stream in any other suitable manner.

However, the method 200 can additionally or alternatively include any other suitable elements performed in any suitable manner.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A system for monitoring network communications on a field bus, the system comprising:
    a clock generator;
    a memory module;
    a first network receiver communicatively coupled to a first signal transmission element of the field bus;
    a second network receiver communicatively coupled to a second signal transmission element of the field bus;
    a first packet decoder communicatively coupled to the first network receiver, the clock generator, and the memory module, wherein the first packet decoder:
        receives a first bitstream from the first network receiver;
        receives a clock signal from the clock generator;
        generates a first plurality of timestamped packets based on the first bitstream and the clock signal, wherein each timestamped packet of the first plurality is associated with a respective timestamp; and
        outputs the first plurality of timestamped packets to the memory module;
    a second packet decoder communicatively coupled to the second network receiver, the clock generator, and the memory module, wherein the second packet decoder:
        receives a second bitstream from the second network receiver;
        receives the clock signal from the clock generator;
        generates a second plurality of timestamped packets based on the second bitstream and the clock signal, wherein each timestamped packet of the second plurality is associated with a respective timestamp; and
        outputs the second plurality of timestamped packets to the memory module;
    a stream merger communicatively coupled to the memory module, wherein the stream merger:
        receives the first and second pluralities of timestamped packets from the memory module; and
        based on the respective timestamps of the first and second pluralities of timestamped packets, generates a merged stream of chronologically ordered packets; and
    a plurality of processing units that cooperatively implement the first packet decoder, the second packet decoder, and the stream merger.

2. The system of claim 1, wherein the plurality of processing units and the memory module are collocated within an integrated circuit package.

3. The system of claim 1, wherein the plurality of processing units comprises at least one real-time CPU that implements the first packet decoder and the second packet decoder.

4. The system of claim 3, wherein the plurality of processing units comprises:
    a first real-time CPU that implements the first packet decoder;
    a second real-time CPU that implements the second packet decoder; and
    a third CPU that implements the stream merger.

5. A system for monitoring network communications on a field bus, the system comprising:
    a clock generator;
    a memory module;
    a first network receiver communicatively coupled to a first signal transmission element of the field bus;
    a second network receiver communicatively coupled to a second signal transmission element of the field bus;
    a first packet decoder communicatively coupled to the first network receiver, the clock generator, and the memory module, wherein the first packet decoder:
        receives a first bitstream from the first network receiver;
        receives a clock signal from the clock generator;
        generates a first plurality of timestamped packets based on the first bitstream and the clock signal, wherein each timestamped packet of the first plurality is associated with a respective timestamp; and
        outputs the first plurality of timestamped packets to the memory module;
    a second packet decoder communicatively coupled to the second network receiver, the clock generator, and the memory module, wherein the second packet decoder:
        receives a second bitstream from the second network receiver;
        receives the clock signal from the clock generator;
        generates a second plurality of timestamped packets based on the second bitstream and the clock signal, wherein each timestamped packet of the second plurality is associated with a respective timestamp; and outputs the second plurality of timestamped packets to the memory module; and a stream merger communicatively coupled to the memory module, wherein the stream merger:
  receives the first and second pluralities of timestamped packets from the memory module; and
  based on the respective timestamps of the first and second pluralities of timestamped packets, generates a merged stream of chronologically ordered packets;

wherein:
  the first signal transmission element comprises a first electrical conductor;
  the first network receiver is electrically coupled to and samples a first voltage associated with the first electrical conductor;
  the second signal transmission element comprises a second electrical conductor; and
  the second network receiver is electrically coupled to and samples a second voltage associated with the second electrical conductor.

6. The system of claim 5, wherein the first packet decoder, the second packet decoder, the stream merger, and the memory module are collocated on a single die.

7. The system of claim 5, wherein:
  the first network receiver comprises a first physical layer receiver circuit associated with an Ethernet physical layer transmission standard, wherein the first physical layer receiver circuit samples the first voltage; and
  the second network receiver comprises a second physical layer receiver circuit associated with the Ethernet physical layer transmission standard, wherein the second physical layer receiver circuit samples the second voltage.

8. The system of claim 7, wherein:
  the Ethernet physical layer transmission standard is an Ethernet 100BASE-T physical layer transmission standard;
  the field bus comprises a 100BASE-TX Ethernet line; and
  the 100BASE-TX Ethernet line comprises the first and second electrical conductors.

9. The system of claim 5, wherein:
  voltage signals transmitted along the first signal transmission element propagate past the first network receiver substantially without alteration; and
  voltage signals transmitted along the second signal transmission element propagate past the second network receiver substantially without alteration.

10. The system of claim 5, wherein:
  the first electrical conductor and the first network receiver cooperatively define a first electrical T junction; and
  the second electrical conductor and the second network receiver cooperatively define a second electrical T junction.

11. A method for monitoring network communications on a field bus, the method comprising:
  throughout a time period:
    passively receiving a first set of signals from a first signal transmission element of the field bus;
    passively receiving a second set of signals from a second signal transmission element of the field bus; and
    receiving a clock signal;
  based on the first set of signals, generating a first bitstream;
  based on the second set of signals, generating a second bitstream;

generating a first plurality of timestamped packets based on the first bitstream and the clock signal, wherein each packet of the first plurality is generated based on a respective window of the first bitstream and is associated with a respective timestamp, the respective timestamp associated with a respective time at which the respective window was passively received;

generating a second plurality of timestamped packets based on the second bitstream and the clock signal, wherein each packet of the second plurality is generated based on a respective window of the first bitstream and is associated with a respective timestamp, the respective timestamp associated with a respective time at which the respective window was passively received; and generating a merged stream of chronologically-ordered packets, comprising, based on the timestamps associated with the packets of the first and second pluralities, chronologically ordering the packets of the first and second pluralities.

12. The method of claim 11, wherein:
  the first set of signals continues along the first signal transmission element substantially unchanged and substantially without delay; and
  the second set of signals continues along the second signal transmission element substantially unchanged and substantially without delay.

13. The method of claim 11, wherein:
  the first set of signals comprises every signal received from the first signal transmission element;
  the second set of signals comprises every signal received from the second signal transmission element;
  the first plurality of timestamped packets is indicative of every signal of the first set of signals; and
  the second plurality of timestamped packets is indicative of every signal of the second set of signals.

14. The method of claim 13, wherein the merged stream comprises each packet of the first and second pluralities.

15. The method of claim 11, wherein the first set of signals is associated with an Ethernet physical layer transmission standard, wherein the first set of signals defines:
  a bit time greater than 5 ns; and
  an inter-frame gap of less than 96 bit times.

16. The method of claim 11, wherein the first set of signals is associated with an Ethernet physical layer transmission standard, wherein the first plurality of timestamped packets comprises a packet of less than 64 bytes.

17. The method of claim 11, wherein the first set of signals is associated with an Ethernet physical layer transmission standard, wherein the first plurality of timestamped packets comprises a packet that does not comprise a start frame delimiter.

18. The method of claim 17, wherein the packet is generated based on a window of the first bitstream, wherein the packet comprises a 0x5 nibble immediately preceding a 0xD nibble, wherein generating the first plurality of timestamped packets comprises:
  determining a mismatch between the window and a checksum associated with the window;
  in response to determining the mismatch, inserting the 0xD nibble immediately following the 0x5 nibble to generate a modified window;

determining a match between the modified window and the checksum; and in response to determining the match, generating the packet based on the modified window.

\* \* \* \* \*